United States Patent
Aimura (10) Patent No.: US 9,037,343 B2
(45) Date of Patent: May 19, 2015

(54) LIGHT DISTRIBUTION CONTROL APPARATUS AND LIGHT DISTRIBUTION CONTROL METHOD

(71) Applicant: HONDA MOTOR CO., LTD, Tokyo (JP)

(72) Inventor: Makoto Aimura, Utsunomiya (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 13/785,052

(22) Filed: Mar. 5, 2013

(65) Prior Publication Data

US 2013/0238186 A1  Sep. 12, 2013

(30) Foreign Application Priority Data

Mar. 6, 2012  (JP) ................. 2012-048867

(51) Int. Cl.
  *B60Q 1/08*  (2006.01)
  *B60Q 1/52*  (2006.01)

(52) U.S. Cl.
  CPC ............... *B60Q 1/085* (2013.01); *B60Q 1/525* (2013.01); *B60Q 2300/45* (2013.01)

(58) Field of Classification Search
  CPC ..... B60Q 1/085; B60Q 1/525; B60Q 2300/45
  USPC ............. 701/36; 340/937, 435; 348/148; 382/102, 104
  See application file for complete search history.

(56) References Cited

U.S. PATENT DOCUMENTS

| | | | |
|---|---|---|---|
| 6,281,806 B1 | 8/2001 | Smith et al. | |
| 7,233,233 B2 * | 6/2007 | Taniguchi et al. | 340/435 |
| 7,370,975 B2 * | 5/2008 | Taniguchi et al. | 353/69 |
| 7,436,982 B2 * | 10/2008 | Taniguchi et al. | 382/104 |
| 7,567,688 B2 * | 7/2009 | Nagaoka et al. | 382/103 |
| 7,786,898 B2 * | 8/2010 | Stein et al. | 340/937 |
| 7,949,151 B2 * | 5/2011 | Taniguchi et al. | 382/104 |
| 7,982,748 B2 * | 7/2011 | Taniguchi et al. | 345/619 |
| 8,005,266 B2 * | 8/2011 | Saka et al. | 382/104 |

(Continued)

FOREIGN PATENT DOCUMENTS

| | | |
|---|---|---|
| CN | 101303735 A | 11/2008 |
| CN | 101500841 A | 8/2009 |

(Continued)

OTHER PUBLICATIONS

European Search Report dated Jul. 11, 2013, issued in corresponding European Patent Application No. 13157567.2.

(Continued)

*Primary Examiner* — Thomas G Black
*Assistant Examiner* — Wae Louie
(74) *Attorney, Agent, or Firm* — Westerman, Hattori, Daniels & Adrian, LLP (57) ABSTRACT

In a case where a light distribution control apparatus judges that there is a possibility that a driver's own vehicle and an animal will contact each other if it is assumed that the animal remains at the present position, then it controls headlight such that the head of the animal is out of the illuminating range of the headlight. In a case where the light distribution control apparatus judges that there is no possibility that the driver's own vehicle and the animal will contact each other if it is assumed that the animal remains at the present position, then it controls the headlight such that the head of the animal is within the illuminating range of the headlight.

12 Claims, 9 Drawing Sheets

(56) References Cited

U.S. PATENT DOCUMENTS

| | | | |
|---|---|---|---|
| 8,077,204 B2* | 12/2011 | Yokochi et al. | 348/148 |
| 8,115,809 B2* | 2/2012 | Taniguchi et al. | |
| 2006/0115120 A1* | 6/2006 | Taniguchi et al. | 382/104 |
| 2006/0115163 A1* | 6/2006 | Nagaoka et al. | 382/209 |
| 2007/0102214 A1 | 5/2007 | Wittorf et al. | |
| 2007/0269079 A1* | 11/2007 | Taniguchi et al. | 382/104 |
| 2007/0291987 A1* | 12/2007 | Saka et al. | 382/103 |
| 2008/0130954 A1* | 6/2008 | Taniguchi et al. | 382/104 |
| 2008/0309516 A1 | 12/2008 | Friedrichs et al. | |
| 2009/0033540 A1* | 2/2009 | Breed et al. | 342/29 |
| 2009/0210157 A1 | 8/2009 | Lee | |
| 2010/0283845 A1* | 11/2010 | Yokochi et al. | 348/135 |
| 2011/0068910 A1* | 3/2011 | Iwai et al. | 340/435 |
| 2012/0105639 A1* | 5/2012 | Stein et al. | 348/148 |
| 2012/0147188 A1* | 6/2012 | Yokochi et al. | 348/148 |
| 2013/0238186 A1* | 9/2013 | Aimura | 701/36 |

FOREIGN PATENT DOCUMENTS

| | | |
|---|---|---|
| DE | 103 54 104 A1 | 6/2005 |
| DE | 102005041235 A1 | 3/2007 |
| DE | 10 2006 041 857 A1 | 4/2007 |
| DE | 102009051485 A1 | 6/2010 |
| GB | 2 395 390 A | 5/2004 |
| JP | 07-137574 A | 5/1995 |
| JP | 11-301343 A | 11/1999 |
| JP | 2007-038877 A | 2/2007 |
| JP | 2010-018165 A | 1/2010 |
| JP | 2011-084106 A | 4/2011 |

OTHER PUBLICATIONS

Notice of Allowance dated Feb. 12, 2014, issued in corresponding Japanese application No. 2012-048867, w/ partial English translation (4 pages).

Chinese Office Action dated Dec. 19, 2014, issued in corresponding CN Patent Application No. 201310071525.X with English partial translation (7 pages).

* cited by examiner

FIG. 8

LIGHT DISTRIBUTION CONTROL APPARATUS AND LIGHT DISTRIBUTION CONTROL METHOD

CROSS-REFERENCE TO RELATED APPLICATION

This application is based upon and claims the benefit of priority from Japanese Patent Application No. 2012-048867 filed on Mar. 6, 2012, the contents of which are incorporated herein by reference.

BACKGROUND OF THE INVENTION

1. Field of the Invention

The present invention relates to a light distribution control apparatus and a light distribution control method for controlling the illuminating range (including the illuminating direction) of a headlight. More specifically, the present invention relates to a light distribution control apparatus and a light distribution control method for illuminating, with a headlight, an animal that lies in the traveling direction of a vehicle.

2. Description of the Related Art

According to Japanese Laid-Open Patent Publication No. 07-137574 (hereinafter referred to as "JP 07-137574 A"), when an obstacle is detected in front of a driver's own vehicle, at least one of the brightness, the irradiating range, and the irradiating direction of a headlamp for illuminating the obstacle is calculated and controlled (claim 1). The obstacle is reliably illuminated with the light from the headlamp, so that the driver on the driver's own vehicle is prompted to notice the presence of the obstacle ([0011]).

According to JP 07-137574 A, coordinates R (Xr, Yr–β) that are positioned downwardly from the coordinates R (Xr, Yr) of the upper end of an obstacle such as a pedestrian or the like by a given value β predetermined from the size of a standard human face are determined as the "irradiating range" and "irradiating direction". The coordinates R (Xr, Yr–β) are established as a position Ho on the image of a cutting line (the boundary line between an illuminated area and a non-illuminated area at the time a road is illuminated with light [0002]) that passes through the coordinates, and the position of the cutting line is determined ([0068]).

There has been developed a technology for detecting an animal using image information {see U.S. Patent Application Publication No. 2007/0269079 (hereinafter referred to as "US 2007/0269079 A1") and U.S. Patent Application Publication No. 2008/0130954 (hereinafter referred to as "US 2008/0130954 A1")}.

SUMMARY OF THE INVENTION

According to JP 07-137574 A, the upper limit of an area illuminated with the light (headlight) from the headlamp is established in view of the size of a standard human face. However, there is room for improvement with respect to the area illuminated with the headlight.

For example, when the eyes of an animal such as deer or the like are illuminated with headlight, the animal has a habit (or a tendency) of temporarily freezing (stopping) on the spot. However, there is nothing discussed about it in JP 07-137574 A.

It is an object of the present invention to provide a light distribution control apparatus and a light distribution control method which are capable of illuminating an object with a headlight appropriately.

According to the present invention, there is provided a light distribution control apparatus comprising an animal position extractor for extracting a present position of an animal which is present outside of a driver's own vehicle with a vehicle-mounted sensor, a traveling direction detector for detecting a traveling direction of the driver's own vehicle, a contact possibility determiner for judging whether or not there is a possibility that the driver's own vehicle and the animal will contact each other after the elapse of a predetermined period of time if it is assumed that the animal remains at the present position thereof, and a light distribution controller for changing an illuminating range or illuminating direction of headlight, wherein if the contact possibility determiner judges that there is a possibility that the driver's own vehicle and the animal will contact each other, then the head of the animal is made to be out of the illuminating range of the headlight, and if the contact possibility determiner judges that there is no possibility that the driver's own vehicle and the animal will contact each other, then the head of the animal is made to be within the illuminating range of the headlight.

According to the present invention, the headlight can be applied more appropriately to the road in front of the driver's own vehicle by avoiding contact with the animal.

When the eyes of an animal are illuminated with light, the animal has a habit (or a tendency) of temporarily freezing (stopping) on the spot. According to the present invention, in a case where it is judged that there is a possibility that the driver's own vehicle and an animal will contact each other if it is assumed that the animal remains at the present position, then the headlight is controlled such that the head of the animal is out of the illuminating range of the headlight. Therefore, the animal is prevented from freezing with the headlight which would otherwise be applied to the head of the animal. Consequently, the possibility that the driver's own vehicle and the animal will contact each other is reduced. In a case where it is judged that there is no possibility that the driver's own vehicle and the animal will contact each other if it is assumed that the animal remains at the present position, then the headlight is controlled such that the head of the animal is within the illuminating range of the headlight. Therefore, the animal is caused to freeze with the headlight which is applied to the head of the animal. Consequently, the animal is prevented from entering the course of the vehicle. Therefore, the headlight can be applied more appropriately.

The vehicle-mounted sensor may comprise at least one of an infrared camera, a color camera, an infrared radar, and an ultrasonic sensor, for example.

If the vehicle-mounted sensor comprises an infrared camera, then the animal position extractor extracts the present position of the animal based on a grayscale image acquired by the infrared camera.

The contact possibility determiner may divide a field in front of the driver's own vehicle into a first area including a traveling lane of the driver's own vehicle, and second areas disposed respectively on left and right sides of the first area. If the animal is within the second areas and is moving away from the traveling lane, the head of the animal may be made to be out of the illuminating range of the headlight. Therefore, the present invention can cause the animal to move farther away from the traveling lane.

According to the present invention, there is also provided a light distribution control method comprising an animal position extracting step of extracting a present position of an animal which is present outside of a driver's own vehicle with a vehicle-mounted sensor, a traveling direction detecting step of detecting a traveling direction of the driver's own vehicle, a contact possibility determining step of judging whether or not there is a possibility that the driver's own vehicle and the animal will contact each other after the elapse of a predetermined period of time if it is assumed that the animal remains at the present position thereof, and a light distribution controlling step of changing an illuminating range or illuminating direction of headlight, wherein in the contact possibility determining step, if it is judged that there is a possibility that the driver's own vehicle and the animal will contact each other, then the head of the animal is made to be out of the illuminating range of the headlight, and in the contact possibility determining step, if it is judged that there is no possibility that the driver's own vehicle and the animal will contact each other, then the head of the animal is made to be within the illuminating range of the headlight.

According to the present invention, there is further provided a light distribution control apparatus comprising animal position extracting means for extracting a present position of an animal which is present outside of a driver's own vehicle with a vehicle-mounted sensor, traveling direction detecting means for detecting a traveling direction of the driver's own vehicle, contact possibility determining means for judging whether or not there is a possibility that the driver's own vehicle and the animal will contact each other after the elapse of a predetermined period of time if it is assumed that the animal remains at the present position thereof, and light distribution control means for changing an illuminating range or illuminating direction of headlight, wherein if the contact possibility determining means judges that there is a possibility that the driver's own vehicle and the animal will contact each other, then the head of the animal is made to be out of the illuminating range of the headlight, and if the contact possibility determining means judges that there is no possibility that the driver's own vehicle and the animal will contact each other, then the head of the animal is made to be within the illuminating range of the headlight.

The above and other objects, features, and advantages of the present invention will become more apparent from the following description when taken in conjunction with the accompanying drawings in which preferred embodiments are shown by way of illustrative example.

DESCRIPTION OF THE PREFERRED EMBODIMENTS

A. Embodiment:
[1. Configuration]
(1-1. Overall Configuration)

Figure 1:
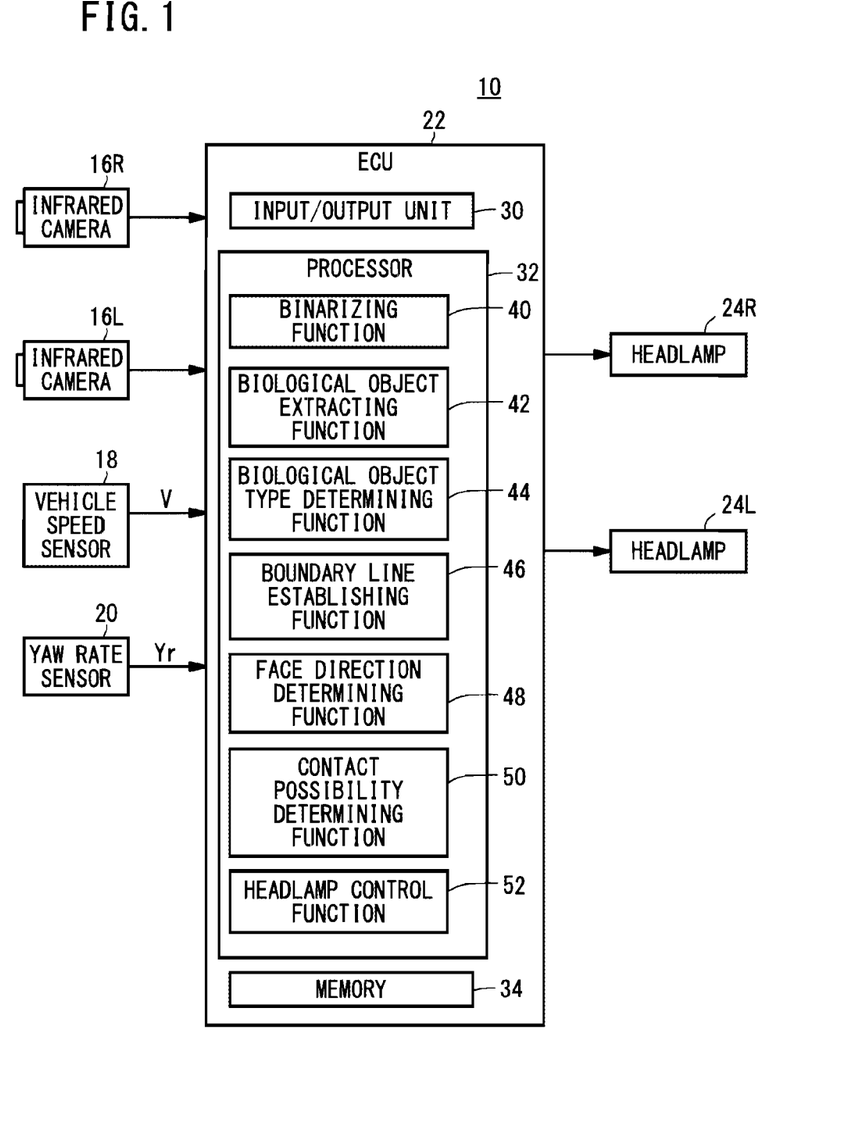
FIG. 1 is a block diagram of a light distribution control apparatus according to an embodiment of the present invention.
Figure 2:
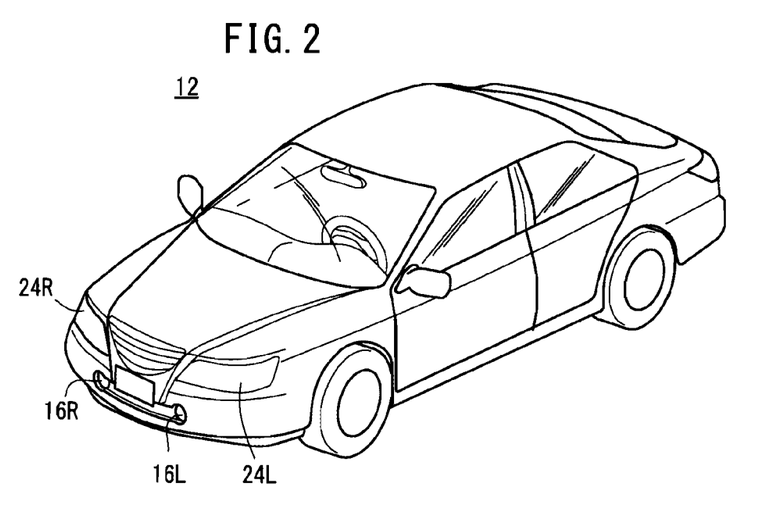
FIG. 2 is a perspective view of a vehicle incorporating the light distribution control apparatus therein.

FIG. 1 shows in block form a light distribution control apparatus 10 (hereinafter also referred to as "control apparatus 10") according to an embodiment of the present invention. FIG. 2 shows in perspective a vehicle 12 (hereinafter referred to as "driver's own vehicle 12") incorporating the light distribution control apparatus 10 therein.

As shown in FIGS. 1 and 2, the light distribution control apparatus 10 has left and right infrared cameras 16L, 16R (hereinafter also referred to as "cameras 16L, 16R"), a vehicle speed sensor 18, a yaw rate sensor 20, an electronic control unit 22 (hereinafter referred to as "ECU 22"), and left and right headlamps 24L, 24R.

(1-2. Infrared Cameras 16L, 16R)

The infrared cameras 16L, 16R (vehicle-mounted sensors) function as an imaging means for capturing images in the periphery of the vehicle 12. According to the present embodiment, the two cameras 16L, 16R are combined into a stereo camera. The cameras 16L, 16R have such characteristics that their output signals have a higher level (a higher luminance level) as the temperature of a subject imaged thereby is higher.

As shown in FIG. 2, the cameras 16L, 16R are mounted in a front bumper of the vehicle 12 at respective positions that are symmetric with respect to the central axis in the transverse direction of the vehicle 12. The cameras 16L, 16R have respective optical axes parallel to each other and are located at equal heights from the road surface.

The imaging means for capturing images in the periphery of the vehicle 12 is not limited to the cameras 16L, 16R shown in FIG. 2, but may be of any of various structures. For example, the imaging means may be either a stereo camera or a monocular camera, and should preferably be combined with a rangefinder (radar device). The imaging means may comprise cameras for capturing images based on light having wavelengths in the visible range, referred to as color cameras, rather than infrared cameras, or may comprise a combination of infrared cameras and color cameras.

(1-3. Vehicle Speed Sensor 18 and Yaw Rate Sensor 20)

The vehicle speed sensor 18 detects a vehicle speed V [km/h] of the vehicle 12, and outputs the detected vehicle speed V to the ECU 22. The yaw rate sensor 20 detects a yaw rate Yr [°/sec] of the vehicle 12, and outputs the detected yaw rate Yr to the ECU 22.

(1-4. ECU 22)

The ECU 22 controls the control apparatus 10 in its entirety. As shown in FIG. 1, the ECU 22 has an input/output unit 30, a processor 32, and a memory 34.

The cameras 16L, 16R, the speed sensor 18, and the yaw rate sensor 20 supply their signals through the input/output unit 30 to the ECU 22. The ECU 22 outputs its output signals through the input/output unit 30 to the headlamps 24L, 24R. The input/output unit 30 includes an A/D converter, not shown, for converting analog signals input thereto into digital signals.

The processor 32 performs various processing operations on the signals from the cameras 16L, 16R, the speed sensor 18, and the yaw rate sensor 20, and generates signals to be output to the headlamps 24L, 24R based on the processed results.

As shown in FIG. 1, the processor 32 has a binarizing function 40, a biological object extracting function 42, a biological object type determining function 44, a boundary line establishing function 46 (driver's own vehicle course determining function), a face direction determining function 48 (animal course determining function), a contact possibility determining function 50, and a headlamp control function 52. These functions 40, 42, 44, 46, 48, 50, 52 are realized when a program stored in the memory 34 is executed by the ECU 22. The program may be supplied from an external source to the ECU 22 through a wireless communication device (a mobile telephone, a smartphone, or the like), not shown.

The binarizing function 40 binarizes a grayscale image 70 (see FIG. 7) acquired by one of the cameras 16L, 16R (the left camera 16L in the present embodiment) to generate a binarized image, not shown. The biological object extracting function 42 extracts a biological object (an object to be monitored) such as a human being, an animal, or the like in the grayscale image 70 and the binarized image. The biological object type determining function 44 judges whether the extracted object to be monitored is a human being (an adult or a child), an animal, or the like (including an object that cannot be judged). The biological object extracting function 42 and the biological object type determining function 44 function as an animal position extractor/animal position extracting means.

The boundary line establishing function 46 (traveling direction detector/traveling direction detecting means) establishes hypothetical boundary lines 82L, 82R (FIG. 7) to be described later. The face direction determining function 48 determines the face direction (hereinafter referred to as "face direction X") of an animal 60 (see FIG. 7, etc.). The contact possibility determining function 50 (contact possibility determiner/contact possibility determining means) determines the possibility that the driver's own vehicle 12 and the animal 60 will contact each other at the present position of the animal 60. The headlamp control function 52 (light distribution controller/light distribution control means) controls the headlamps 24L, 24R based on the determined result from the contact possibility determining function 50.

The memory 34 comprises a RAM (Random Access Memory) for storing image signals converted into digital signals, temporary data for use in various processing sequences, and other data, and a ROM (Read Only Memory) for storing the program to be run by the ECU 22, tables, maps, etc.

(1-5. Headlamps 24L, 24R)

Figure 5:
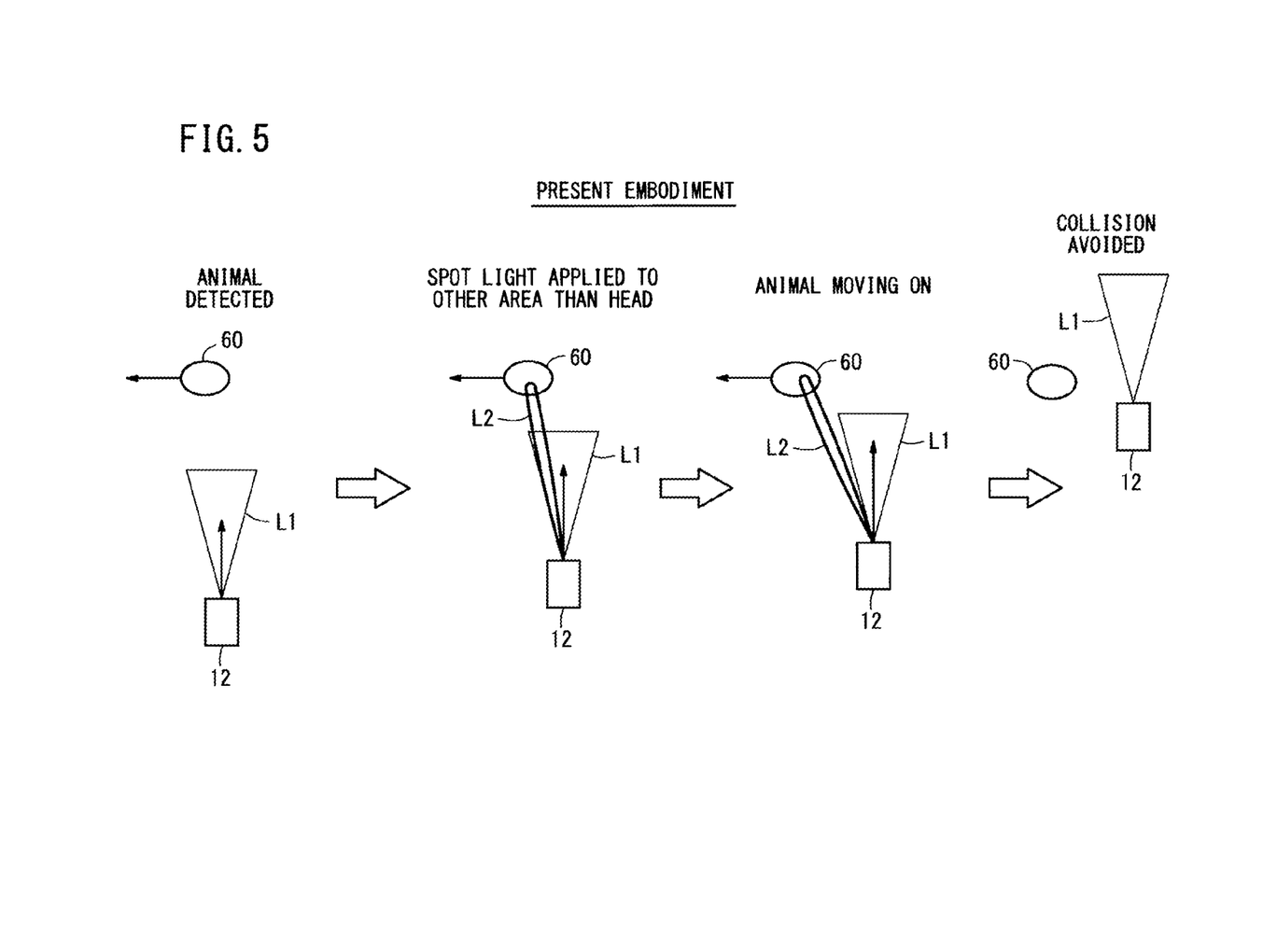
FIG. 5 is a first diagram illustrative of a sequence for controlling the illuminating range of headlight.
Figure 6:
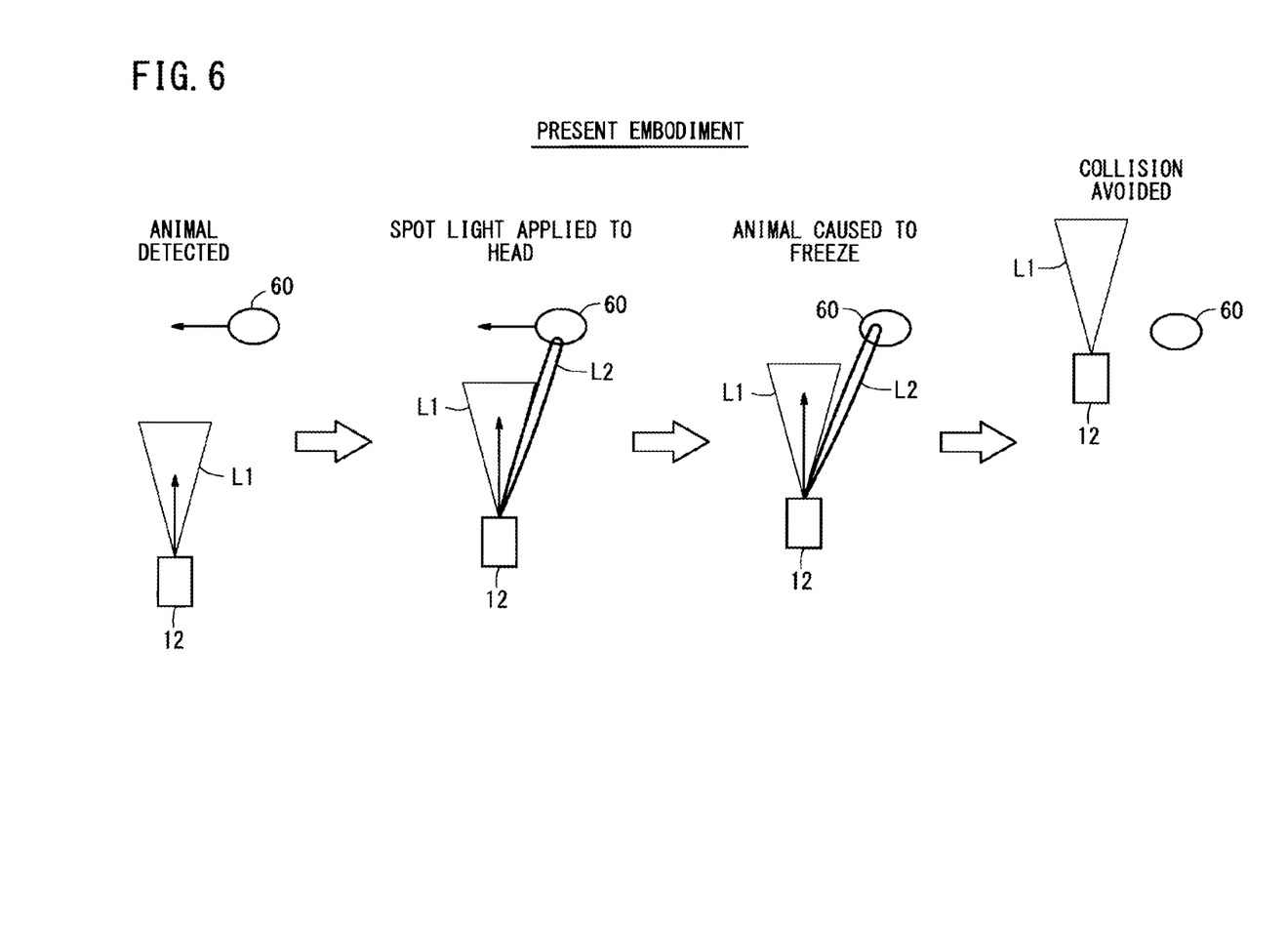
FIG. 6 is a second diagram illustrative of a sequence for controlling the illuminating range of headlight.

According to the present embodiment, the headlamps 24L, 24R emit headlight L1 as front illumination light for illuminating a field in front of the vehicle 12 and headlight L2 as spot light for making the driver aware of the presence of the animal 60 (see FIGS. 5 and 6). The headlight L1 can be switched between a low beam and a high beam. The headlight L2 can have its illuminating range which can be adjusted in vertical directions and transverse or widthwise directions of the vehicle 12. The term "illuminating range" is used in a wide sense including both illuminating directions (i.e., longitudinal, vertical, and transverse directions of the vehicle 12), and the size of an illuminated area.

[2. Control of the Illuminating Range of the Headlight L2]

A process of controlling the illuminating range of the headlight L2 according to the present embodiment will be described below.

(2-1. Basic Concept)

Figure 3:
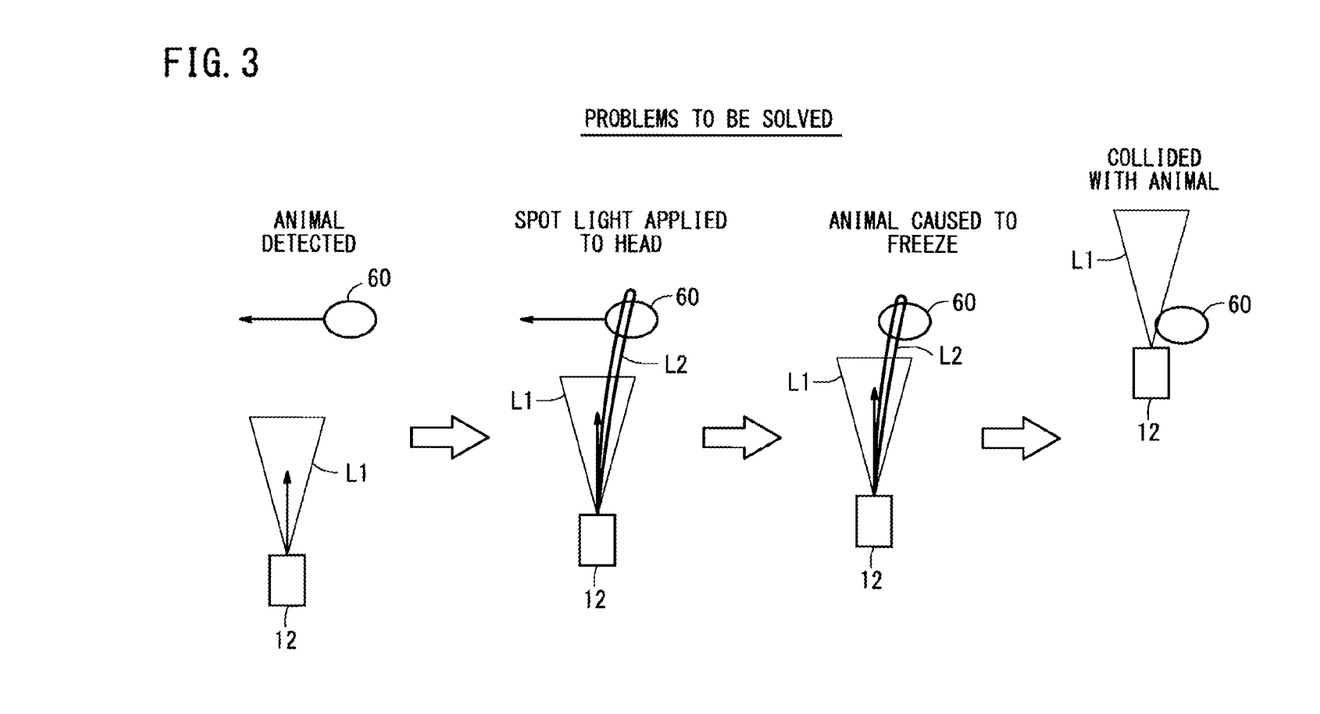
FIG. 3 is a diagram illustrative of a basic concept of the control of the illuminating range of headlight (spot light) according to the embodiment.

FIG. 3 is a diagram illustrative of a basic concept of the control of the illuminating range of headlight L2 (spot light) according to the present embodiment. It should be noted that FIG. 3 does not show details of the present embodiment, but illustrates a problem to be solved by the present embodiment, i.e., the present invention.

The animal 60 such as deer or the like has a habit of temporarily freezing (stopping) on the spot if the eyes of the animal 60 are illuminated with light (headlight L2) from the headlamps 24L, 24R. Therefore, if the eyes of the animal 60 are illuminated with the headlight L2 when the animal 60 is on or near a lane (traveling lane) 62 (FIG. 7) on which the driver's own vehicle 12 is traveling, the animal 60 temporarily stops on the spot. As a result, the possibility that the driver's own vehicle 12 and the animal 60 will collide with each other increases (see FIG. 3).

According to the present embodiment, in a case where, if an animal 60 stops on the spot, the possibility that the driver's own vehicle 12 will collide with the animal 60 is increased, the headlight L2 is applied to the animal 60 in a manner to avoid the head of the animal 60, e.g., by being vertically adjusted to a low-beam position. Since the headlight L2 is not applied to the eyes of the animal 60, therefore, the animal 60 does not freeze on the spot, and the driver can recognize the presence of the animal 60 on or near the traveling lane 62.

In a case where there is no possibility that the animal 60 will collide with the driver's own vehicle 12 even if the animal 60 stops on the spot, or in a case where the possibility that the animal 60 will collide with the driver's own vehicle 12 is reduced by making the animal 60 stop on the spot, the headlight L2 from the headlamps 24L, 24R is applied to the head of the animal 60, e.g., by being vertically adjusted to a high-beam position. Since the headlight L2 is applied to the eyes of the animal 60, therefore, the animal 60 freezes on the spot and the driver can recognize the presence of the animal 60 on or near the traveling lane 62.

(2-2. Overall Processing Sequence)

Figure 4:
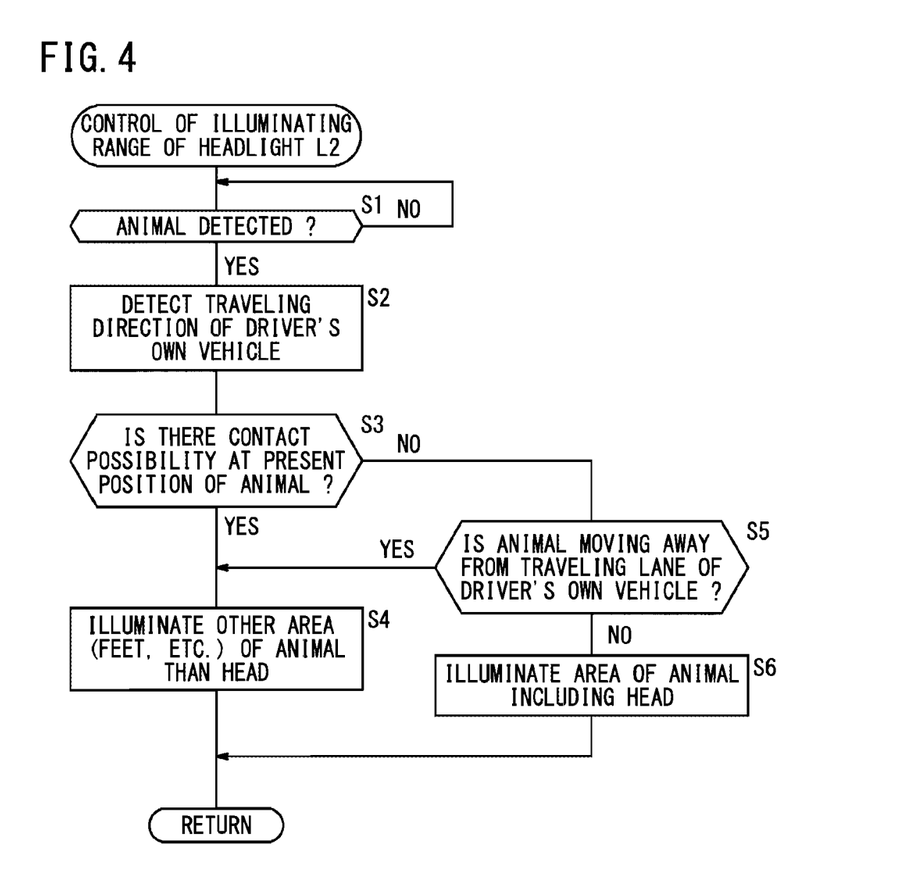
FIG. 4 is a flowchart of a processing sequence for controlling the illuminating range of headlight according to the embodiment.

FIG. 4 is a flowchart of a processing sequence for controlling the illuminating range of the headlight L2 according to the embodiment. FIGS. 5 and 6 are first and diagrams, respectively, illustrative of a sequence for controlling the illuminating range of the headlight L2. When the headlight L2 is emitted as spot light from each of the headlamps 24L, 24R, it is emitted as two light beams respectively from the headlamps 24L, 24R. In FIGS. 5 and 6, these two light beams are collectively illustrated as a single beam for illustrative purposes.

In step S1 shown in FIG. 4, the ECU 22 (biological object type determining function 44) judges whether an animal 60 is detected ahead of the driver's own vehicle 12 or not. If an animal 60 is not detected (S1: NO), then the step S1 is repeated. If an animal 60 is detected (S1: YES), then control goes to step S2.

In step S2, the ECU 22 (boundary line establishing function 46) detects the traveling direction of the driver's own vehicle 12. The detected traveling direction is used to establish hypothetical boundary lines 82L, 82R (FIG. 7) to be described later.

In step S3, the ECU 22 (contact possibility determining function 50) judges whether or not there is a possibility (hereinafter referred to as "present position contact possibility" or "contact possibility") that the animal 60 stopping at the present position will collide with the driver's own vehicle 12.

If there is a present position contact possibility (S3: YES), then the ECU 22 (headlamp control function 52) controls the headlamps 24L, 24R to apply the headlight L2 to an area (e.g., feet) of the animal 60 other than the head thereof in step S4.

The animal 60 is thus prevented from freezing on the spot by being surprised by the headlight L2, and becomes less likely to contact the driver's own vehicle 12 (see FIG. 5).

If there is no present position contact possibility (S3: NO), then the ECU 22 (face direction determining function 48) judges whether the animal 60 is moving away from the traveling lane 62 or not based on the face direction X of the animal 60 in step S5. If the animal 60 is moving away from the traveling lane 62 (S5: YES), then the ECU 22 (headlamp control function 52) controls the headlamps 24L, 24R to apply the headlight L2 to the feet of the animal 60 in step S4. Therefore, the animal 60 moves farther away from the traveling lane 62.

If the animal 60 is not moving away from the traveling lane 62 (S5: NO), then the ECU 22 (headlamp control function 52) controls the headlamps 24L, 24R to apply the headlight L2 to the head 64 of the animal 60 in step S6. Consequently, the animal 60 is prevented from moving into a position where the animal 60 may possibly contact the driver's own vehicle 12 (see FIG. 6).

(2-3. Process of Detecting the Animal 60)

The ECU 22 detects the animal 60 in the traveling direction of the driver's own vehicle 12 based on an output signal from one of the infrared cameras 16L, 16R (the left camera 16L in the present embodiment). More specifically, the ECU 22 converts the signal (image signal) from the camera 16L into a digital signal which represents a grayscale image 70 (see FIG. 7). Then, the ECU 22 (binarizing function 40) performs a binarizing process on the grayscale image 70 to generate a binarized image, not shown.

The ECU 22 (biological object extracting function 42) extracts a biological object area 72 (FIG. 7) from the binarized image and the grayscale image 70. Since a biological object is higher in temperature than its surroundings, an area corresponding to the biological object (biological object area 72) in the binarized image and the grayscale image 70 is of a higher luminance level. It is thus possible to extract the biological object area 72 by searching the binarized image and the grayscale image 70 for an area of pixels whose luminance levels are higher than a given threshold value.

The ECU 22 (biological object type determining function 44) determines the type of a biological object represented by the extracted biological object area 72. More specifically, the ECU 22 (biological object type determining function 44) judges whether the extracted biological object area 72 represents a human adult, a human child, or an animal. The ECU 22 may determine any of various other biological object types than those specified above.

(2-4. judging whether there is a present position contact possibility or not)

A process of judging whether there is a possibility (present position contact possibility) that the animal 60 staying at the present position will contact the driver's own vehicle 12 or not will be described below.

(2-4-1. Sectioning of a Front Space)

Figure 7:
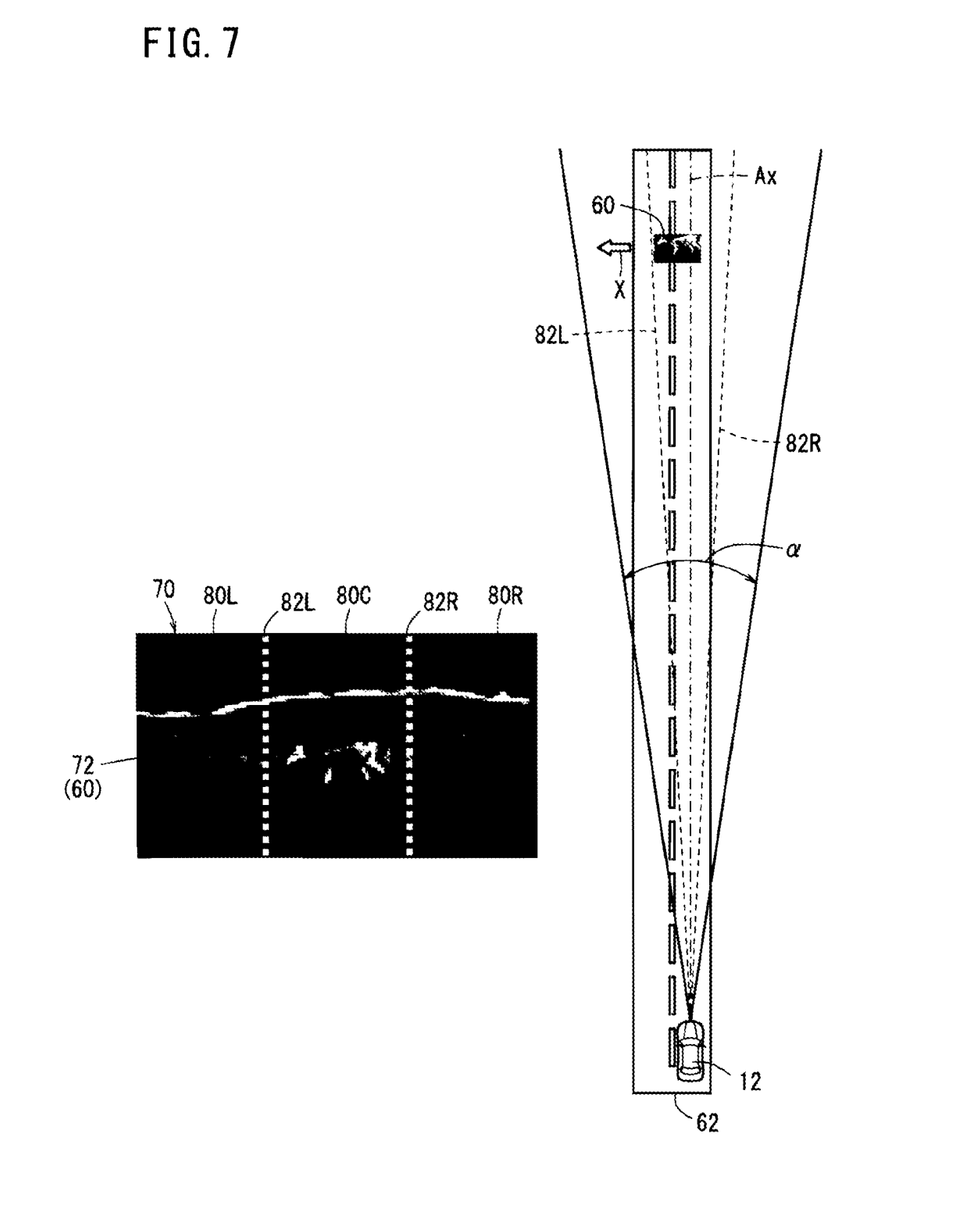
FIG. 7 is a diagram showing a positional relationship between the vehicle (driver's own vehicle) and an animal, and also showing a grayscale image (image for explanation) based on the positional relationship.

FIG. 7 is a diagram showing a positional relationship between the driver's own vehicle 12 and the animal 60, and also showing the grayscale image 70 (illustrative image) based on the positional relationship. FIG. 7 shows in a right area thereof the driver's own vehicle 12 and a situation in its surroundings. In the right area shown in FIG. 7, "Ax" represents a longitudinal central line (e.g., the optical axis of the infrared camera 16L) of the vehicle 12 along the traveling direction thereof, and "α" represents the angle of view of the infrared camera 16L.

FIG. 7 shows in a left area thereof the grayscale image 70 captured by the infrared camera 16L. In FIG. 7, the grayscale image 70 is used for an easier understanding of the invention. Actually, however, both the grayscale image 70 and the binarized image are used in the judging process, as described above.

According to the present embodiment, as shown in FIG. 7, a space (area or field) in front of the driver's own vehicle 12 is divided into three hypothetical areas, i.e., a central area 80C (driver's own vehicle traveling lane area), a left area 80L, and a right area 80R. The central area 80C, the left area 80L, and the right area 80R will hereinafter also be collectively referred to as "hypothetical areas 80".

The central area 80C (driver's own vehicle traveling lane area/first area) is an area disposed centrally among the three hypothetical areas 80. The central area 80C is an area where the driver's own vehicle 12 may possibly collide with the animal 60 if the animal 60 stays at the present position in the area. For example, the central area 80C may be equal to the traveling lane 62. Alternatively, the central area 80C may be wider or narrower than the traveling lane 62 in the transverse directions of the driver's own vehicle 12.

The left area 80L (second area) is an area on the left side of the central area 80C. The left area 80L is an area where the driver's own vehicle 12 will not collide with the animal 60 if the animal 60 stays at the present position in the area. The right area 80R (second area) is an area on the right side of the central area 80C. The right area 80R is an area where the driver's own vehicle 12 will not collide with the animal 60 if the animal 60 stays at the present position in the area.

Hereinafter, a hypothetical boundary line between the central area 80C and the left area 80L will be referred to as "left hypothetical boundary line 82L" or "boundary line 82L", and a hypothetical boundary line between the central area 80C and the right area 80R as "right hypothetical boundary line 82R" or "boundary line 82R". The left hypothetical boundary line 82L and the right hypothetical boundary line 82R will be collectively referred to as "hypothetical boundary lines 82" or "boundary lines 82".

Hypothetical boundary lines 82 are hypothetical lines not included in the actual grayscale image 70 and binarized image, and can be shifted in the transverse directions of the vehicle 12 as described in detail later with reference to FIG. 8. In an actual processing sequence, the hypothetical areas 80 may not be used, but only the boundary lines 82 may be used. To give a sense of perspective to the grayscale image 70, the boundary lines 82 may be shaped to extend along the lanes 62, i.e., the distance between the boundary lines 82L, 82R becomes progressively smaller in a direction toward the upper edge of the grayscale image 70 in FIG. 7.

(2-4-2. Establishing of the Boundary Lines 82)

Figure 8:
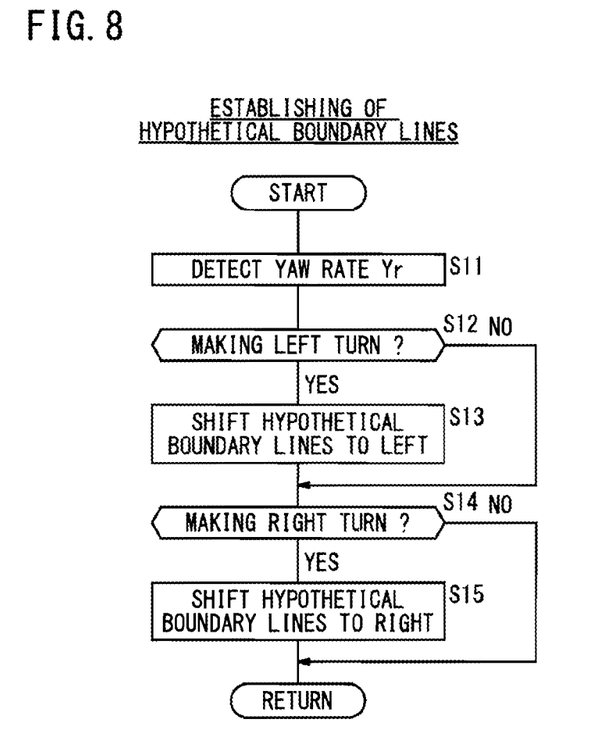
FIG. 8 is a flowchart of a processing sequence for establishing hypothetical boundary lines.

FIG. 8 is a flowchart of a processing sequence for establishing the hypothetical boundary lines 82. In step S11 shown in FIG. 8, the yaw rate sensor 20 detects a yaw rate Yr of the vehicle 12. In step S12, the ECU 22 (boundary line establishing function 46) judges whether the vehicle 12 is making a left turn or not based on the yaw rate Yr detected by the yaw rate sensor 20. For example, a threshold value (left turn threshold value) for the yaw rate Yr by which to judge whether the vehicle 12 is making a left turn or not is set in advance, and it is judged whether the detected yaw rate Yr exceeds the left turn threshold value or not.

If the vehicle 12 is not making a left turn (S12: NO), then control goes to step S14. If the vehicle 12 is making a left turn (S12: YES), then the ECU 22 (boundary line establishing function 46) shifts each of the hypothetical boundary lines 82 to the left in step S13. Therefore, the hypothetical areas 80 are established to match the traveling direction (leftward direction) of the vehicle 12 for determining a contact possibility.

In step S14, the ECU 22 (boundary line establishing function 46) judges whether the vehicle 12 is making a right turn or not based on the yaw rate Yr detected by the yaw rate sensor 20. For example, a threshold value (right turn threshold value) for the yaw rate Yr by which to judge whether the vehicle 12 is making a right turn or not is set in advance, and it is judged whether the detected yaw rate Yr exceeds the right turn threshold value or not.

If the vehicle 12 is not making a right turn (S14: NO), then the processing sequence is ended. If the vehicle 12 is making a right turn (S14: YES), then the ECU 22 (boundary line establishing function 46) shifts each of the hypothetical boundary lines 82 to the right in step S15. Therefore, the hypothetical areas 80 are established to match the traveling direction (rightward direction) of the vehicle 12 for determining a contact possibility.

(2-4-3. Moving Direction of the Animal 60)

If it is possible to determine which one of the central area 80C (driver's own vehicle traveling lane area), the left area 80L, and the right area 80R the animal 60 is positioned in, then it is basically possible to determine which one of an area of the animal 60 including head thereof and an area (e.g., feet) of the animal 60 excluding the head thereof should be illuminated with the headlight L2.

According to the present embodiment, a more appropriate area to be illuminated with the headlight L2 is established by taking into account the moving direction (face direction X) of the animal 60.

More specifically, when the animal 60 is positioned in the left area 80L or the right area 80R, the animal 60 may subsequently take one of a plurality of different behavioral options, e.g., the animal 60 may move into the central area 80C, may stay in the left area 80L or the right area 80R, or may move away from the traveling lane 62. If the animal 60 is within the left area 80L or the right area 80R and is moving away from the traveling lane 62, then the headlight L2 is not applied to the head 64 of the animal 60, thereby enabling the animal 60 to move farther away from the traveling lane 62.

The traveling direction of the animal 60 can be determined by determining the face direction X or body direction of the animal 60 as disclosed in US 2007/0269079 A1 or US 2008/0130954 A1, for example. The face direction X or the body direction should preferably be detected by calculating the angle of the face or body direction of the animal 60 with respect to the optical axis of the camera 16L as viewed in plan. Alternatively, the animal 60 may simply be determined as facing to the left or right, or stated otherwise, as facing inwardly or outwardly, as viewed from the vehicle 12 or the driver.

[3. Advantages Of The Present Embodiment]

According to the present embodiment, as described above, the headlight L2 can be applied more appropriately to the road in front of the vehicle 12 by avoiding contact with the animal 60.

More specifically, the animal 60 has a habit of freezing when the eyes thereof are illuminated with light. According to the present embodiment, if it is judged that there is a possibility that the animal 60 stopping at the present position will collide with the driver's own vehicle 12 (S3 in FIG. 4: YES), then the headlight is controlled such that the head of the animal 60 is out of the illuminating range of the headlight L2 (S4). Therefore, the animal 60 is prevented from freezing with the headlight L2 which would otherwise be applied to the head of the animal 60. Consequently, the possibility that the driver's own vehicle 12 and the animal 60 will contact each other is reduced (see FIG. 5).

If it is judged that there is no possibility that the animal 60 stopping at the present position will collide with the driver's own vehicle 12 (S3 in FIG. 4: NO), then the headlight is controlled such that the head of the animal 60 is within the illuminating range of the headlight L2 (S6). Therefore, the animal 60 is caused to freeze with the headlight L2 which is applied to the head of the animal 60. Consequently, the animal 60 is prevented from entering the course of the vehicle 12 (see FIG. 6).

According to the present embodiment, the ECU 22 (contact possibility determining function 50) divides the area in front of the driver's own vehicle 12 into the central area 80C (first area) including the traveling lane 62 of the driver's own vehicle 12, the left area 80L (second area) positioned on the left side of the central area 80C, and the right area 80R (second area) positioned on the right side of the central area 80C. If the animal 60 is within the left area 80L or the right area 80R and is moving away from the traveling lane 62 (S5 in FIG. 4: YES), then the head of the animal 60 is made to be out of the illuminating range of the headlight L2 (S4), thereby enabling the animal 60 to move farther away from the traveling lane 62.

B. Modifications

The present invention is not limited to the above embodiment, but may adopt various arrangements based on the disclosure of the present description. For example, the present invention may adopt the following arrangements:

[1. Object Which Can Incorporate The Invention]

In the above embodiment, the vehicle 12 is a four-wheeled vehicle (see FIG. 2). However, the vehicle 12 which incorporates the light distribution control apparatus 10 is not limited to a four-wheeled vehicle, but may be a two-wheeled vehicle (including a bicycle), a three-wheeled vehicle, or a six-wheeled vehicle, for example.

In the above embodiment, the light distribution control apparatus 10 is incorporated in the vehicle 12. However, the light distribution control apparatus 10 may be incorporated in other mobile bodies insofar as they are arranged to detect an object (such as an animal 60 or the like) to be monitored in the periphery, and notify the driver of the presence of the object using illuminating light. Such mobile bodies include ships and aircrafts.

[2. Vehicle-Mounted Sensors]

In the above embodiment, the two infrared cameras 16L, 16R are used as the imaging means for capturing images in the periphery of the vehicle 12. However, any other imaging means may be used insofar as they can capture images in the periphery of the vehicle 12. For example, the imaging means may be either a stereo camera or a monocular camera. Alternatively, the imaging means may be cameras for capturing images based on light having wavelengths in the visible range, referred to as color cameras, instead of infrared cameras, or may comprise a combination of infrared cameras and color cameras.

Alternatively, vehicle-mounted sensors which are different from cameras, e.g., infrared radars or ultrasonic sensors, which are capable of recognizing the position of an animal 60, may be used.

[3. Headlamps 24L, 24R]

In the above embodiment, the headlights L1, L2 are emitted respectively from the left and right headlamps 24L, 24R. However, each of the headlights L1, L2 may be emitted from a pair of left and right headlamps. More specifically, the headlight L1 serving as front illumination light for illuminating a field in front of the vehicle 12 may be emitted from a pair of left and right first headlamps, and the headlight L2 serving as spot light for illuminating an animal 60 may be emitted from a pair of left and right second headlamps.

In the above embodiment, the headlight L2 has its illuminating direction which can be adjusted in longitudinal or lengthwise directions of the vehicle 12, vertical directions of the vehicle 12, and transverse or widthwise directions of the vehicle 12. However, for example, the headlight direction may be switched only between a low beam and a high beam. In other words, only the headlight L1 serving as front illumination light may be emitted, and the headlight L2 may not be emitted at all. More specifically, the headlight L1 may be emitted as a high beam to illuminate the head of the animal 60, and the headlight L1 may be emitted as a low beam not to illuminate the head of the animal 60.

[4. Illuminating Range of the Headlight L2]

(4-1. Judging whether there is a Present Position Contact Possibility or not)

(4-1-1. Hypothetical Areas 80)

In the above embodiment, the area in front of the vehicle 12 is divided into the three hypothetical areas 80 (see FIG. 7). However, the area in front of the vehicle 12 may be divided into a plurality of hypothetical areas 80, e.g., two or four or more hypothetical areas 80.

In the above embodiment, the hypothetical areas 80 are separate laterally, i.e., in the transverse directions of the vehicle 12. However, how to divide the area is not limited to the above. For example, the hypothetical areas 80 may be separate in the longitudinal directions of the vehicle 12, i.e., along the traveling direction of the vehicle 12. Further alternatively, if the boundary lines 82 may be shaped to extend along the lanes 62, i.e., the distance between the boundary lines 82L, 82R becomes progressively smaller in a direction toward the upper edge of the grayscale image 70 in FIG. 7, to give a sense of perspective to the grayscale image 70, then the hypothetical areas 80 may be separate in shape to match the boundary lines 82.

(4-1-2. Hypothetical Boundary Lines 82)

In the above embodiment, the positions of the hypothetical boundary lines 82 are adjusted based on the yaw rate Yr. However, the positions of the hypothetical boundary lines 82 may be adjusted based on the traveling direction or course of the driver's own vehicle 12, not the yaw rate Yr. For example, the positions of the hypothetical boundary lines 82 may be adjusted based on the steering wheel angle detected by a steering angle sensor, not shown, and the vehicle speed V. Alternatively, the positions of the hypothetical boundary lines 82 may be adjusted based on course information from a navigation system or a light beacon, not shown.

Further alternatively, providing the driver's own vehicle 12 travels straight, the positions of the hypothetical boundary lines 82 may not be adjusted, i.e., the light distribution control apparatus 10 may perform its processing sequence without detecting the traveling direction or course of the driver's own vehicle 12.

(4-1-3. Detection of the Face Direction X)

In the above embodiment, the face direction X of the animal 60 is used as a criterion for estimating the moving direction or course of the animal 60. However, another criterion may be used for estimating the moving direction or course of the animal 60. For example, the body direction of the animal 60 may be used together with or instead of the face direction X of the animal 60.

(4-2. In A Case Where There Are Plural Animals 60)

In the above embodiment, a case where there is only one animal 60 has been explained. However, the present invention is also applicable where there are a plurality of animals 60 that are detected.

Figure 9:
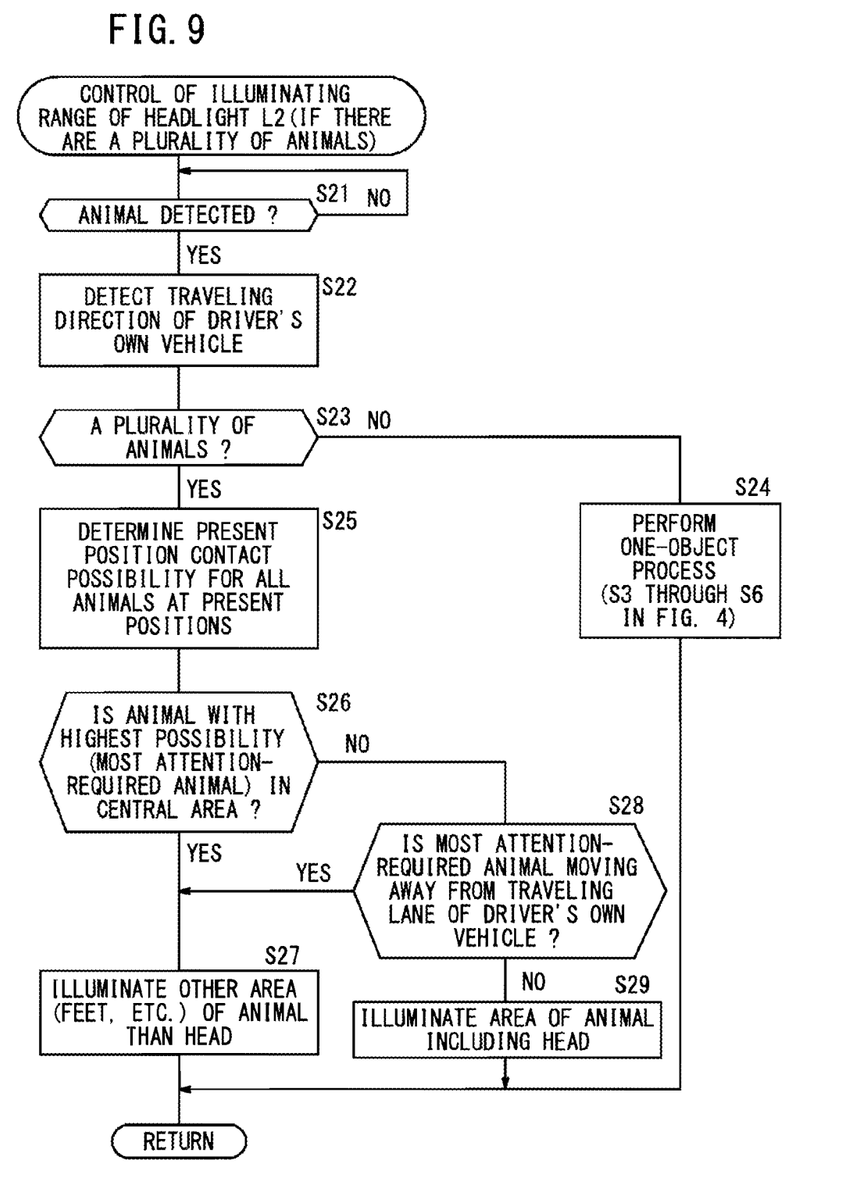
FIG. 9 is a flowchart of a processing sequence according to a modification of the processing sequence shown in FIG. 4, for controlling the illuminating range of headlight in a situation where there are a plurality of animals.

FIG. 9 is a flowchart of a processing sequence according to a modification of the processing sequence shown in FIG. 4, for controlling the illuminating range of the headlight L2 in a situation where there are a plurality of animals 60. Steps S21, S22 shown in FIG. 9 are the same as steps S1, S2 shown in FIG. 4.

In step S23, the ECU 22 (biological object type determining function 44) judges whether there are a plurality of detected animals 60 or not. If there is only one detected animal 60 (S23: NO), then the ECU 22 performs a process for one animal 60 (hereinafter referred to as "one-object process") in step S24. Steps S3 through S6 shown in FIG. 4, for example, may be carried as the one-object process.

If there are a plurality of detected animals 60 (S23: YES), then the ECU 22 (contact possibility determining function 50) determines in step S25 a contact possibility (present position contact possibility) that the animal 60 at the present position will collide with the driver's own vehicle 12, with respect to all the animals 60.

In step S25, the ECU 22 does not merely judge whether there is a contact possibility or not, but calculates a contact possibility as a numerical value. For example, if an animal 60 is positioned closer to the central line Ax (FIG. 7) of the vehicle 12 along the traveling direction thereof, then the ECU 22 determines that there is a higher contact possibility. Alternatively, the ECU 22 may correct the distance from an animal 60 to the central line Ax with the face direction X (moving direction) of the animal 60 to determine a contact possibility. For example, the ECU 22 firstly determines a raw value of contact possibility based on the distance from an animal 60 to the central line Ax. Next, if the face direction X of the animal 60 extends toward the central line Ax (the animal 60 faces inwardly), then the ECU 22 multiplies the raw value by a coefficient greater than 1 so as to provide an increased contact possibility. If the face direction X of the animal 60 extends away from the central line Ax (the animal 60 faces outwardly), then the ECU 22 multiplies the raw value by a coefficient greater than 0 but smaller than 1 so as to provide a reduced contact possibility. The contact possibilities thus calculated of the respective detected animals 60 are then compared with each other.

In step S26, the ECU 22 judges whether the animal 60 with the highest contact possibility (hereinafter referred to as "most attention-required animal") is positioned in the central area 80C or not. If the most attention-required animal is positioned in the central area 80C (S26: YES), then the ECU 22 (headlamp control function 52) controls the headlamps 24L, 24R to apply the headlight L2 to an area (e.g., feet) of the most attention-required animal other than the head thereof in step S27. The most attention-required animal is thus prevented from freezing on the spot by being surprised by the headlight L2, and becomes less likely to contact the driver's own vehicle 12 (see FIG. 5).

If the most attention-required animal is not positioned in the central area 80C (S26: NO), then the ECU 22 (face direction determining function 48) judges whether the most attention-required animal is moving away from the traveling lane 62 or not based on the face direction X of the most attention-required animal in step S28. If the most attention-required animal is moving away from the traveling lane 62 (S28: YES), then the ECU 22 (headlamp control function 52) controls the headlamps 24L, 24R to apply the headlight L2 to an area (e.g., feet) of the most attention-required animal other than the head thereof in step S27. Therefore, the most attention-required animal moves farther away from the traveling lane 62.

If the most attention-required animal is not moving away from the traveling lane 62 (S28: NO), then the ECU 22 (headlamp control function 52) controls the headlamps 24L, 24R to apply the headlight L2 to an area including the head of the most attention-required animal in step S29. Consequently, the most attention-required animal is prevented from moving into a position where the most attention-required animal may possibly contact the driver's own vehicle 12 (see FIG. 6).

Alternatively, if there are two animals 60 in a hypothetical area 80, particularly the central area 80C, then the animal 60 on the left side may be illuminated with the headlight L2 from the left headlamp 24L, and the animal 60 on the right side may be illuminated with the headlight L2 from the right headlamp 24R. Further alternatively, if there are more than two animals 60 in a hypothetical area 80, particularly the central area 80C, then the animals 60 may successively be illuminated in turns with the headlight L2.

(4-3. Others)

In the above embodiment, the illuminating range of the headlight L2 is established based on which one of the hypothetical areas 80 the animal 60 is positioned in and also based on the facing direction X of the animal 60 (FIG. 4). However, the illuminating range of the headlight L2 may be established based only on which one of the hypothetical areas 80 the animal 60 is positioned in.

[5. Others]

In the above embodiment, the light distribution control apparatus 10 is used to detect an animal or animals 60 and perform the processing sequence based on the detected animal or animals. However, the light distribution control apparatus 10 can be applied to a human being. Alternatively, the light distribution control apparatus 10 may be arranged to perform the processing sequence when a biological object, which may be an animal or animals 60 or a pedestrian or pedestrians (human being), is detected with no distinction between the animals 60 and the pedestrians.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A light distribution control apparatus comprising:
   an animal position extractor for extracting a present position of an animal which is present outside of a driver's own vehicle with a vehicle-mounted sensor;
   a traveling direction detector for detecting a traveling direction of the driver's own vehicle;
   a contact possibility determiner for judging whether or not there is a possibility that the driver's own vehicle and the animal will contact each other after the elapse of a predetermined period of time if a head of the animal is located within an illuminating range of the headlight and it is assumed that the animal remains at the present position thereof; and
   a light distribution controller for changing the illuminating range or illuminating direction of headlight;
   wherein if the contact possibility determiner judges that there is a possibility that the driver's own vehicle and the animal will contact each other, then the light distribution controller will change the illuminating range or illuminating direction of the headlight so that the head of the animal is made to be out of the illuminating range of the headlight; and
   if the contact possibility determiner judges that there is no possibility that the driver's own vehicle and the animal will contact each other, then the light distribution controller will change the illuminating range or illuminating direction of the headlight so that the head of the animal is made to be within the illuminating range of the headlight.

2. The light distribution control apparatus according to claim 1, wherein the vehicle-mounted sensor comprises an infrared camera; and
   the animal position extractor extracts the present position of the animal based on a grayscale image acquired by the infrared camera.

3. The light distribution control apparatus according to claim 1, wherein the contact possibility determiner divides a field in front of the driver's own vehicle into a first area including a traveling lane of the driver's own vehicle, and second areas disposed respectively on left and right sides of the first area; and
   if the animal is within the second areas and is moving away from the traveling lane, the head of the animal is made to be out of the illuminating range of the headlight.

4. The light distribution control apparatus according to claim 1,
   wherein if the contact possibility determiner judges that there is a possibility that the driver's own vehicle and the animal will contact each other, then the light distribution controller will change the illuminating range or illuminating direction of the headlight so that an area of the animal other than the head thereof is made to be within the illuminating range of the headlight.

5. A light distribution control method comprising:
   an animal position extracting step of extracting a present position of an animal which is present outside of a driver's own vehicle with a vehicle-mounted sensor;
   a traveling direction detecting step of detecting a traveling direction of the driver's own vehicle;
   a contact possibility determining step of judging whether or not there is a possibility that the driver's own vehicle and the animal will contact each other after the elapse of a predetermined period of time if a head of the animal is located within an illuminating range of the headlight and it is assumed that the animal remains at the present position thereof; and
   a light distribution controlling step of changing the illuminating range or illuminating direction of headlight;
   wherein in the contact possibility determining step, if it is judged that there is a possibility that the driver's own vehicle and the animal will contact each other, then the illuminating range or illuminating direction of the headlight will be changed in the light distribution controlling step so that the head of the animal is made to be out of the illuminating range of the headlight; and
   in the contact possibility determining step, if it is judged that there is no possibility that the driver's own vehicle and the animal will contact each other, then the illuminating range or illuminating direction of the headlight will be changed in the light distribution controlling step so that the head of the animal is made to be within the illuminating range of the headlight.

6. The light distribution control method according to claim 5, wherein the vehicle-mounted sensor comprises an infrared camera; and the animal position extracting step comprises the step of extracting the present position of the animal based on a grayscale image acquired by the infrared camera.

7. The light distribution control method according to claim 5, wherein the contact possibility determining step comprises the step of dividing a field in front of the driver's own vehicle into a first area including a traveling lane of the driver's own vehicle, and second areas disposed respectively on left and right sides of the first area; and
  if the animal is within the second areas and is moving away from the traveling lane, the head of the animal is made to be out of the illuminating range of the headlight.

8. The light distribution control method according to claim 5,
  wherein in the contact possibility determining step, it is judged that there is a possibility that the driver's own vehicle and the animal will contact each other, then the illuminating range or illuminating direction of the headlight will be changed in the light distribution controlling step so that the an area of the animal other than the head thereof is made to be within the illuminating range of the headlight.

9. A light distribution control apparatus comprising:
  animal position extracting means for extracting a present position of an animal which is present outside of a driver's own vehicle with a vehicle-mounted sensor;
  traveling direction detecting means for detecting a traveling direction of the driver's own vehicle;
  contact possibility determining means for judging whether or not there is a possibility that the driver's own vehicle and the animal will contact each other after the elapse of a predetermined period of time if a head of the animal is located within an illuminating range of the headlight and it is assumed that the animal remains at the present position thereof; and
  light distribution control means for changing the illuminating range or illuminating direction of headlight;
  wherein if the contact possibility determining means judges that there is a possibility that the driver's own vehicle and the animal will contact each other, then the light distribution control means will change the illuminating range or illuminating direction of the headlight so that the head of the animal is made to be out of the illuminating range of the headlight, and
  if the contact possibility determining means judges that there is no possibility that the driver's own vehicle and the animal will contact each other, then the light distribution control means will change the illuminating range of illuminating direction of the headlight so that the head of the animal is made to be within the illuminating range of the headlight.

10. The light distribution control apparatus according to claim 9, wherein the vehicle-mounted sensor comprises an infrared camera; and
  the animal position extracting means extracts the present position of the animal based on a grayscale image acquired by the infrared camera.

11. The light distribution control apparatus according to claim 9, wherein the contact possibility determining means divides a field in front of the driver's own vehicle into a first area including a traveling lane of the driver's own vehicle, and second areas disposed respectively on left and right sides of the first area; and
  if the animal is within the second areas and is moving away from the traveling lane, the head of the animal is made to be out of the illuminating range of the headlight.

12. The light distribution control apparatus according to claim 9,
  wherein if the contact possibility determiner judges that there is a possibility that the driver's own vehicle and the animal will contact each other, then the light distribution control means will change the illuminating range or illuminating direction of the headlight so that an area of the animal other than the head thereof is made to be within the illuminating range of the headlight.

* * * * *